(12) United States Patent
Hu et al.

(10) Patent No.: US 8,740,438 B2
(45) Date of Patent: Jun. 3, 2014

(54) ILLUMINATION MODULE

(75) Inventors: Chih-Ming Hu, Hsinchu (TW);
Shih-Yuan Yu, Hsinchu (TW);
Chia-Hao Chang, Hsinchu (TW);
Chi-Yun Cheng, Hsinchu (TW);
Jung-Min Hwang, Hsinchu (TW)

(73) Assignee: Young Lighting Technology Corporation, Hsin-Chu (TW)

( * ) Notice: Subject to any disclaimer, the term of this patent is extended or adjusted under 35 U.S.C. 154(b) by 221 days.

(21) Appl. No.: 13/284,133

(22) Filed: Oct. 28, 2011

(65) Prior Publication Data
US 2012/0182762 A1 Jul. 19, 2012

(30) Foreign Application Priority Data
Jan. 18, 2011 (TW) .............................. 100101793 A

(51) Int. Cl.
*F21V 8/00* (2006.01)
*F21V 9/16* (2006.01)

(52) U.S. Cl.
USPC ............. 362/606; 362/84; 362/600; 362/608; 362/231

(58) Field of Classification Search
USPC ............................ 362/84, 600, 606, 608, 231
See application file for complete search history.

(56) References Cited

U.S. PATENT DOCUMENTS

| 6,345,899 | B1 | 2/2002 | Ohkawa et al. | |
| 7,132,785 | B2 * | 11/2006 | Ducharme | 313/501 |
| 8,142,051 | B2 * | 3/2012 | Ducharme | 362/249.02 |
| 2004/0120140 | A1 | 6/2004 | Fye et al. | |
| 2006/0072339 | A1 | 4/2006 | Li et al. | |

FOREIGN PATENT DOCUMENTS

| TW | 200700834 | 1/2007 |
| TW | I323817 | 4/2010 |
| TW | 201033542 | 9/2010 |
| TW | I334504 | 12/2010 |

* cited by examiner

*Primary Examiner* — Stephen F Husar
*Assistant Examiner* — James Cranson, Jr.
(74) *Attorney, Agent, or Firm* — Muncy, Geissler, Olds & Lowe, P.C.

(57) ABSTRACT

An illuminating module includes at least one light-emitting chip, a phosphor, and a color temperature conversion media. The light-emitting chip is capable of emitting wavelength light, and the phosphor is disposed in a propagation path of the wavelength light to transform the wavelength light into a first white light with a first color temperature. The color temperature conversion media is disposed in a propagation path of the first white light to transform the first white light into a second white light with a second color temperature. The second color temperature is smaller than the first color temperature.

16 Claims, 20 Drawing Sheets

ILLUMINATION MODULE

BACKGROUND OF THE INVENTION a. Field of the Invention

The invention relates to an illumination module and, more particularly, to an illumination module having a color temperature conversion medium.

b. Description of the Related Art

Compared with a traditional light source, a light-emitting diode (LED) has the advantages of long lifetime, high luminous efficiency, radiation free, and low power consumption. Therefore, recent trends in the design of an illumination lamp are towards replacing the traditional light source with light-emitting diodes. Generally, the emission color of an illuminating apparatus is determined by the color temperature of a selected LED. Typically, the color temperature of a common illuminating lamp is in the range of 2700K and 7000K. However, light-emitting diodes for illuminating purposes conforming to such range of color temperature are too expensive compared with a traditional light source. Thus, the market share of LEDs in the illuminating applications is relatively low. Typically, LEDs for display purposes are usually much cheaper than LEDs for illuminating purposes, but LEDs for display purposes usually have a color temperature of larger than 9000K to fail to serve illuminating purposes. Therefore, if LEDs used in a display can be modified to fit an illuminating lamp, the fabrication costs of an illuminating lamp using LEDs as a light source are greatly reduced.

As shown in FIG. 1, US patent publication no. 20060072339 discloses a backlight module 100 having a light-emitting diode 102, a light guide plate 104 and a phosphor 106. The light guide plate 104 is disposed adjacent to the light-emitting diode 102, and the phosphor 106 is disposed between the light-emitting diode 102 and the light guide plate 104. The light-emitting diode 102 is, for example, a blue light-emitting diode or a blue light laser diode, and the phosphor 106 includes a yellow fluorescent material. When the phosphor 106 is excited by the blue light emitted by the blue light-emitting diode or the blue light laser diode, the phosphor 106 may emit yellow light. Then, the yellow light is mixed with the blue light emitted by the blue light-emitting diode or the blue light laser diode in the light guide plate 104 to generate white light. Finally, the white light is outputted from the light-emitting surface of the light guide plate 104. Besides, Taiwan patent publication no. 201033542 discloses a light-emitting device having a light-emitting diode, a light guide plate, and a phosphor-containing plate. The phosphor-containing plate may be disposed on a light-emitting surface, a bottom surface, or a light incident surface of the light guide plate. When a light beam of the light-emitting diode passes through the phosphor-containing plate, part of the light beam is transformed into a different color and then mixed with the untransformed light beam to generate white light.

In the above conventional designs, the excitation of fluorescent materials is merely applied to a backlight module to form white light having a high color temperature. However, such high-color-temperature white light fails to be used in a common illumination lamp. In other prior design, U.S. Pat. No. 6,345,899 discloses a backlight module, where yellow and blue ink droplets are distributed on a surface of a reflective plate to compensate for variations in light reflectivity as a result of different wavelengths of light on the reflective plate and to compensate for color non-uniformity of the backlight module as a result of different scattering rates of the light guide plate. Taiwan patent publication no. 200700834 discloses a backlight module, where an ink layer having color-shift particles is formed on a lower surface of a light guide plate to absorb red and green light to compensate for color shift. However, the yellowish color shift in the front end of the light guide plate to cause color non-uniformity of the backlight module still remains.

BRIEF SUMMARY OF THE INVENTION

The invention provides an illumination module having low fabrication costs and high color uniformity.

Other objects and advantages of the invention may be further illustrated by the technical features broadly embodied and described as follows. In order to achieve one of or part or all of the above purposes or other purposes, one embodiment of the invention provides an illumination module including at least one light-emitting chip, a phosphor, and a color temperature conversion medium. The light-emitting chip is capable of emitting a light beam having a specific wavelength, and the phosphor is disposed in a propagation path of the light beam to transform the light beam into first white light with a first color temperature. The color temperature conversion medium is disposed in a propagation path of the first white light to transform the first white light into second white light with a second color temperature. The second color temperature is smaller than the first color temperature.

In one embodiment, the first color temperature is larger than 9000K, and the second color temperature is in the range of 3000K to 6500K.

In one embodiment, the light-emitting chip is a blue light-emitting diode chip or a blue laser diode chip.

In one embodiment, the color temperature conversion medium includes at least one of a fluorescent material and a dye material.

According to another embodiment of the invention, an illumination module includes at least one light-emitting diode, a light guide plate, and a color temperature conversion medium. The light-emitting diode is capable of emitting first white light with a first color temperature and the light-emitting diode includes at least one light-emitting chip and a phosphor. The light-emitting chip is capable of emitting a light beam having a specific wavelength and the phosphor is capable of transforming the light beam into the first white light with a first color temperature. The light guide plate is disposed adjacent to the light-emitting diode, and the color temperature conversion medium is disposed in a propagation path of the first white light to transform the first white light into second white light with a second color temperature. The second color temperature is smaller than the first color temperature.

In one embodiment, the light guide plate has at least one light incident surface, a bottom surface, and a light-emitting surface opposite the bottom surface. The bottom surface and the light-emitting surface are connected with the light incident surface and the light-emitting diode is adjacent to the light incident surface.

In one embodiment, the color temperature conversion medium includes at least one fluorescent layer, and the fluorescent layer is disposed in at least one of the positions between the light-emitting diode and the light incident surface, adjacent to the light-emitting surface, and adjacent to the bottom surface.

In one embodiment, the color temperature conversion medium includes at least one dye layer, and the dye layer is disposed in at least one of the positions between the light-emitting diode and the light incident surface, adjacent to the light-emitting surface, and adjacent to the bottom surface.

In one embodiment, a reflective plate is disposed adjacent to the bottom surface, at least one optical film is disposed adjacent to the light-emitting surface, and a plurality of micro dots are formed on at least one of the bottom surface and the light-emitting surface. The micro dots may include fluorescent dots or dye dots.

In one embodiment, the color temperature conversion medium includes a fluorescent glue, and the fluorescent glue is formed on at least one position of the light incident surface of the light guide plate, the light-emitting surface of the light guide plate, the reflective plate and the optical film.

In one embodiment, the color temperature conversion medium includes a dye glue and the dye glue is formed on at least one position of the light incident surface of the light guide plate, the light-emitting surface of the light guide plate, the reflective plate, and the optical film.

In one embodiment, the illumination module further includes a colored stripe disposed in a propagation path of the first white light. A plurality of transparent zones and a plurality of the color temperature conversion zones are alternately formed on the colored stripe, and the color temperature of the first white light is selectively changed by moving the colored stripe.

In one embodiment, the color, concentration distribution, position distribution, area distribution, or thickness distribution of the color temperature conversion medium varies according to respective color characteristics of different regions of the light-emitting surface of the light guide plate.

In one embodiment, the capability of the color temperature conversion medium to lower color temperature varies along with the position of the color temperature conversion medium.

In one embodiment, a light beam of the first white light incident on the light incident surface at a larger angle results in yellowish color shift and forms a first projecting zone on the light guide plate, and a light beam of the first white light incident on the light incident surface at a smaller angle results in bluish color shift and forms a second projecting zone on the light guide plate. The color temperature conversion medium is a yellow phosphor or a yellow dye, and the concentration, area or thickness of the color temperature conversion medium distributed in the second projecting zone is larger than the concentration, area or thickness of the color temperature conversion medium distributed in the first projecting zone.

In one embodiment, a light beam of the first white light incident on the light incident surface at a larger angle results in yellowish color shift and forms a first projecting zone on the light guide plate, and a light beam of the first white light incident on the light incident surface at a smaller angle results in bluish color shift and forms a second projecting zone on the light guide plate. The color temperature conversion medium includes a plurality of yellow fluorescent dots or yellow dye dots, and the distribution density of the yellow fluorescent dots or the yellow dye dots in the second projecting zone is larger than the distribution density of the yellow fluorescent dots or the yellow dye dots in the first projecting zone.

In conclusion, the illumination module of the embodiments of the invention may have at least one of the following advantages.

According to the above embodiments, light emitted by a light-emitting chip is transformed through excited twice by a fluorescent material or transformed by one fluorescent excitation and one light absorption to obtain white light with a low color temperature, and the white light with a low color temperature is allowed to be directly used for illumination purposes. Therefore, by the design of the secondary conversion, low-cost light-emitting diodes (light-emitting diodes emitting white light and having high-color temperature) are allowed to serve as an illumination light source. Therefore, the fabrication costs of using light-emitting diodes as an illumination light source are decreased. Further, the emission wavelength (color), concentration distribution, area distribution, position distribution, or thickness distribution of the fluorescent/dye layer, fluorescent/dye glue, and fluorescent/dye dots are allowed to be adjusted to coarsely tune, finely tune or locally tune respective color characteristics of different regions of the light guide plate so that the color shift phenomenon in different zones is effectively reduced to improve the color uniformity of the illumination module.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described.

The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
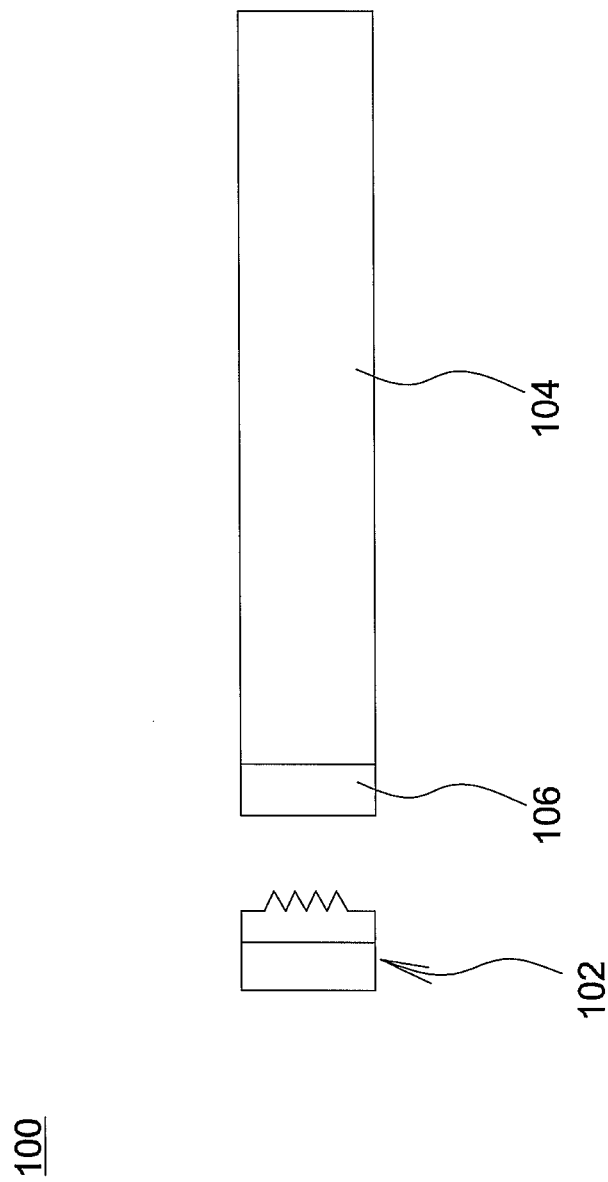
FIG. 1 shows a schematic diagram of a conventional backlight module.
Figure 2:
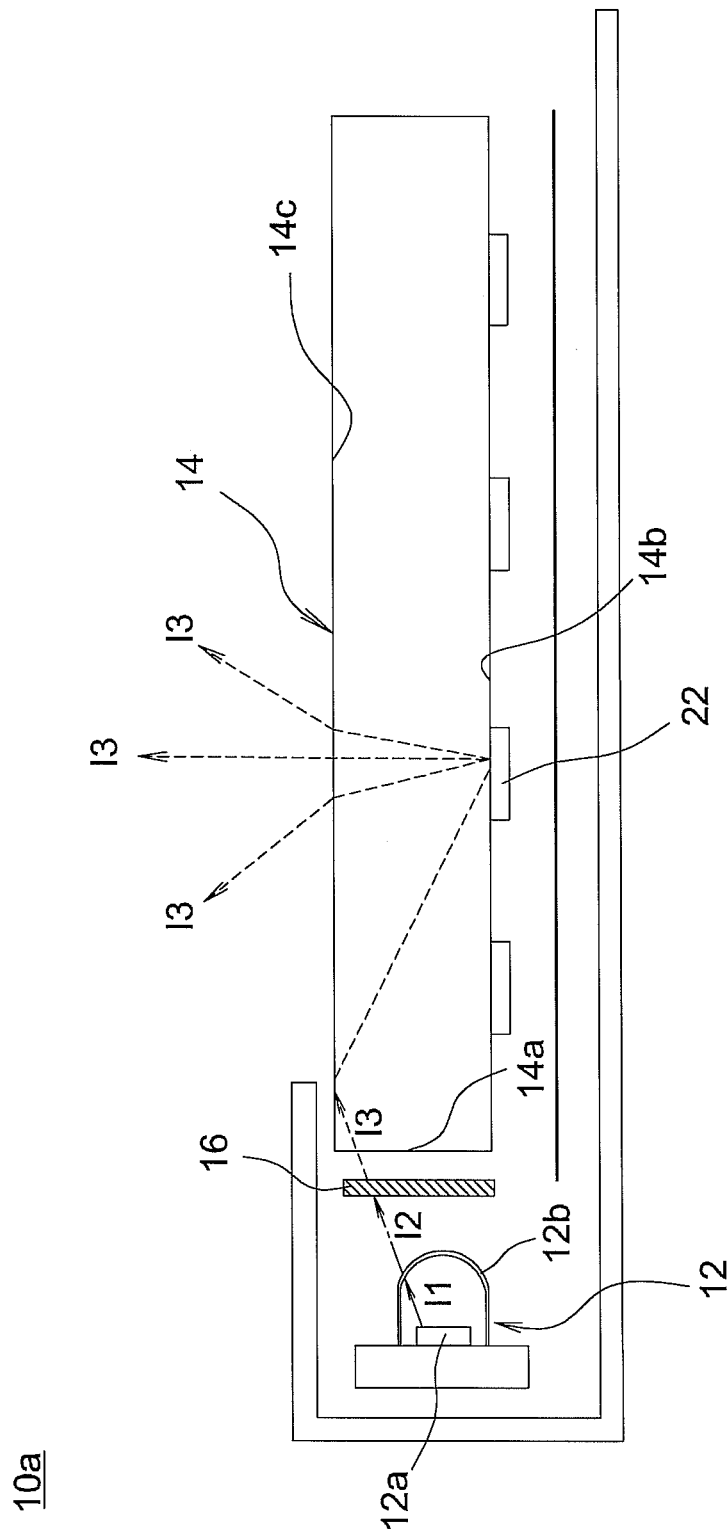
FIG. 2 shows a schematic diagram of an illumination module according to an embodiment of the invention.

Referring to FIG. 2, an illumination module 10a includes at least one light-emitting diode 12, a light guide plate 14, and a color temperature conversion medium 16. The light-emitting diode 12 includes at least one light-emitting chip 12a and a phosphor 12b. For example, the light-emitting chip 12a is a blue light-emitting diode or a blue light laser diode capable of emitting short-wavelength light I1 (such as 150 nm-490 nm). The phosphor 12b is disposed in a propagation path of the short-wavelength light I1 and may be, for example, a yellow fluorescent material. The phosphor 12b is excited by the short-wavelength light I1 (such as blue light) emitted by the light-emitting chip 12a to emit long-wavelength light (such as yellow light), and the yellow light and the blue light are mixed up to generate white light I2 having a high color temperature. In one embodiment, the color temperature of the high-color-temperature white light I2 may be larger than 9000K. The color temperature conversion medium 16 is disposed in a propagation path of the high-color-temperature white light I2. In this embodiment, the color temperature conversion medium 16 is, for example, a fluorescent layer and is disposed between the light-emitting diode 12 and the light guide plate 14. When the high-color-temperature white light I2 passes through the color temperature conversion medium 16, the high-color-temperature white light I2 is transformed into white light I3 having a low color temperature through the effect of fluorescence excitation. In one embodiment, the color temperature of the low-color-temperature white light I3 is in the range of 3000K to 6000K. The light guide plate 14 has at least one light incident surface 14a, a bottom surface 14b and a light-emitting surface 14c opposite the bottom surface 14b. The bottom surface 14b and the light-emitting surface 14c are connected with the light incident surface 14a. The low-color-temperature white light I3 enters the light guide plate 14 via the light incident surface 14a and then is deflected by the micro dots 22 distributed on the bottom surface 14b to exit the light guide plate 14 via the light-emitting surface 14c. Typically, the color temperature of an LED for illuminating purposes is about 2700K-7000K. Therefore, the short wavelength light of the light-emitting chip 12a is excited twice to generate the low-color-temperature white light I3, and the white light I3 is allowed to directly apply to common illumination purposes. Besides, since the fluorescent material when excited provides fluorescent emissions, the brightness sensed by human eyes is increased when the color temperature is shifted to greenish gamut.

Figure 3A:
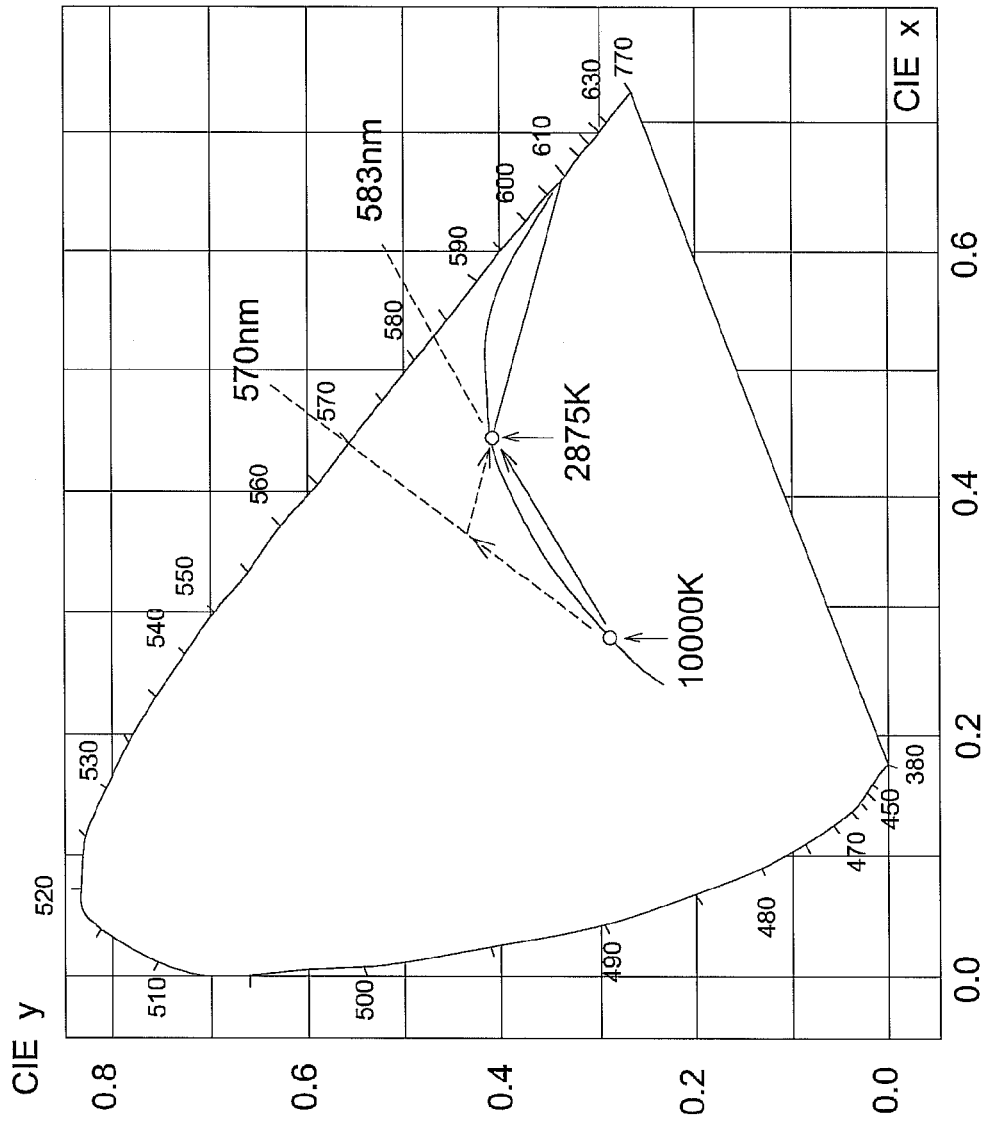
FIG. 3A shows a CIE colorimetric system diagram illustrating color coordinate changes in the process of color temperature conversion.
Figure 3B:
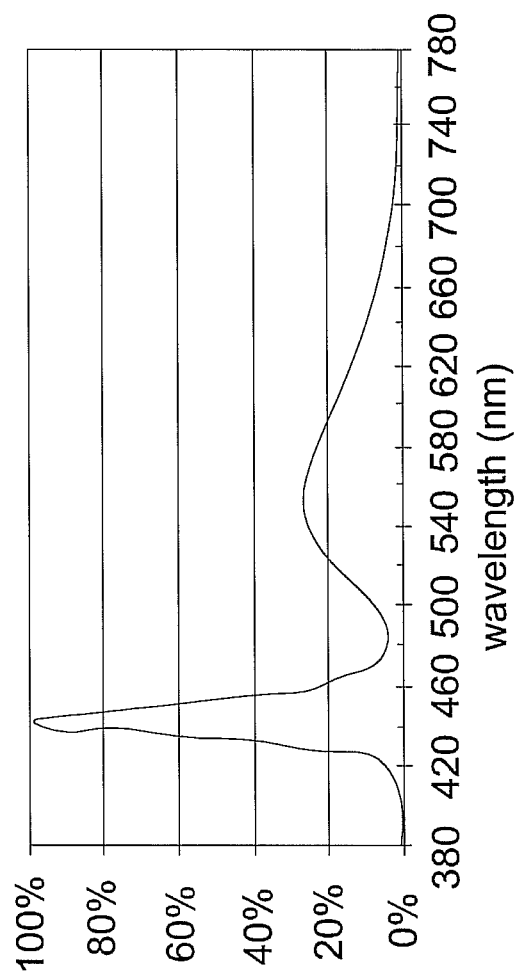
FIGS. 3B-3D show spectrum diagrams illustrating spectrum changes in the process of color temperature conversion.
Figure 3C:
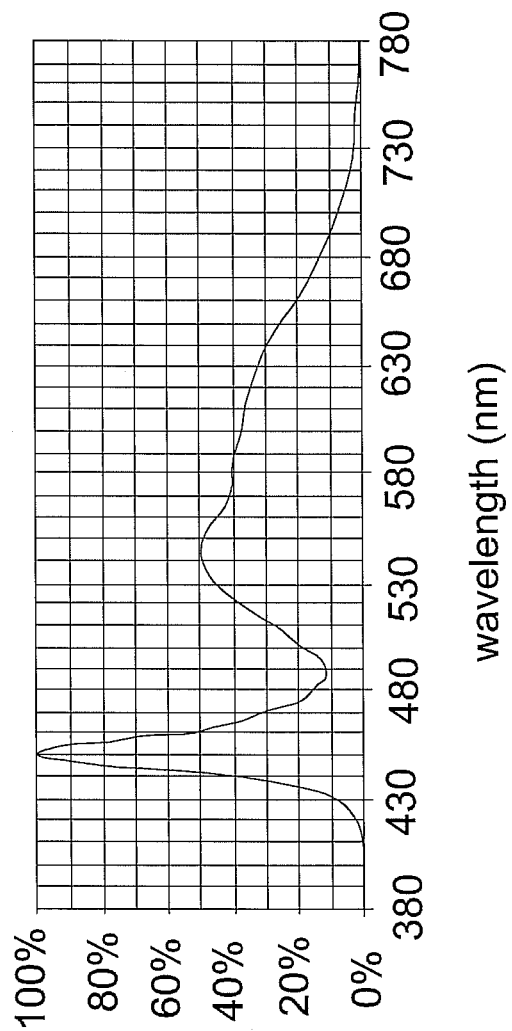
Figure 3D:
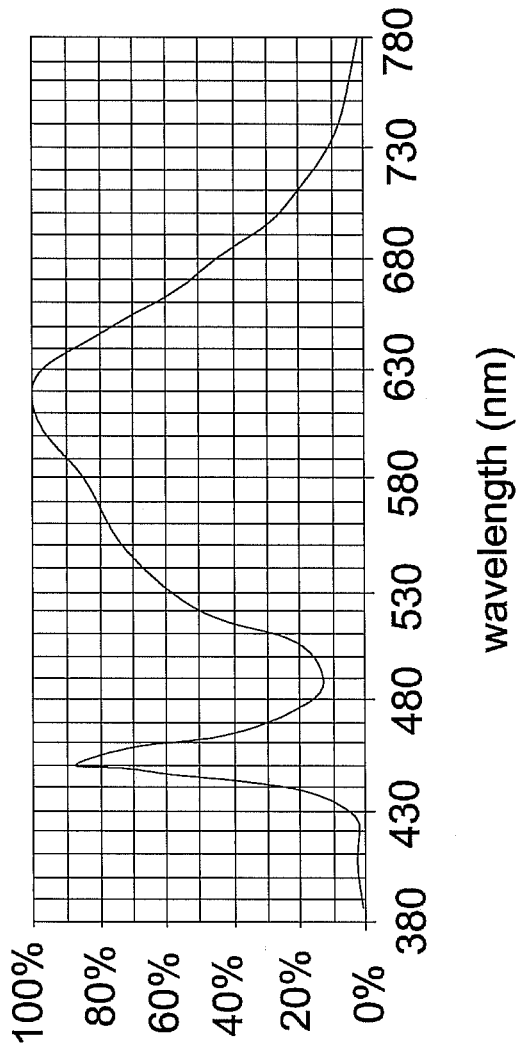

For example, as shown in FIG. 3A, in case the high-color-temperature white light I2 has a high color temperature of 10000K, a yellow fluorescent material such as having an emission wavelength of 583 nm may be used to generate the low-color-temperature white light I3 having a low color temperature of 2875K of the illumination module 10a by adjusting the concentration, active area or other parameter of the fluorescent material. In an alternate embodiment, two or more than two kinds of yellow fluorescent materials with different emission wavelengths may be used to convert the color temperature. In another color temperature conversion path shown in FIG. 3A, a yellow fluorescent material having an emission wavelength of 570 nm and a yellow fluorescent material having an emission wavelength of 610 nm are used to lower the color temperature from 10000K to 2875K. FIGS. 3B-3D show spectrum diagrams illustrating spectrum changes during the process of color temperature conversion. FIG. 3B shows a spectrum of the high-color-temperature white light I2 (having a high color temperature 13000K) before conversion, FIG. 3C shows a spectrum of the low-color-temperature white light I3 (having a low color temperature 6000K) after conversion according to one embodiment, and FIG. 3D shows a spectrum of the low-color-temperature white light I3 (having a low color temperature 3000K) after conversion according to another embodiment of the invention. From FIGS. 3B-3D, it is clearly seen the color temperature conversion medium 16 transforms the high-color-temperature white light (bluish white light) into the white light suitable for general illumination purposes, and the output color temperature and spectrum may be adjusted as needed by adjusting the composition and concentration of a fluorescent material or a dye material.

Figure 4:
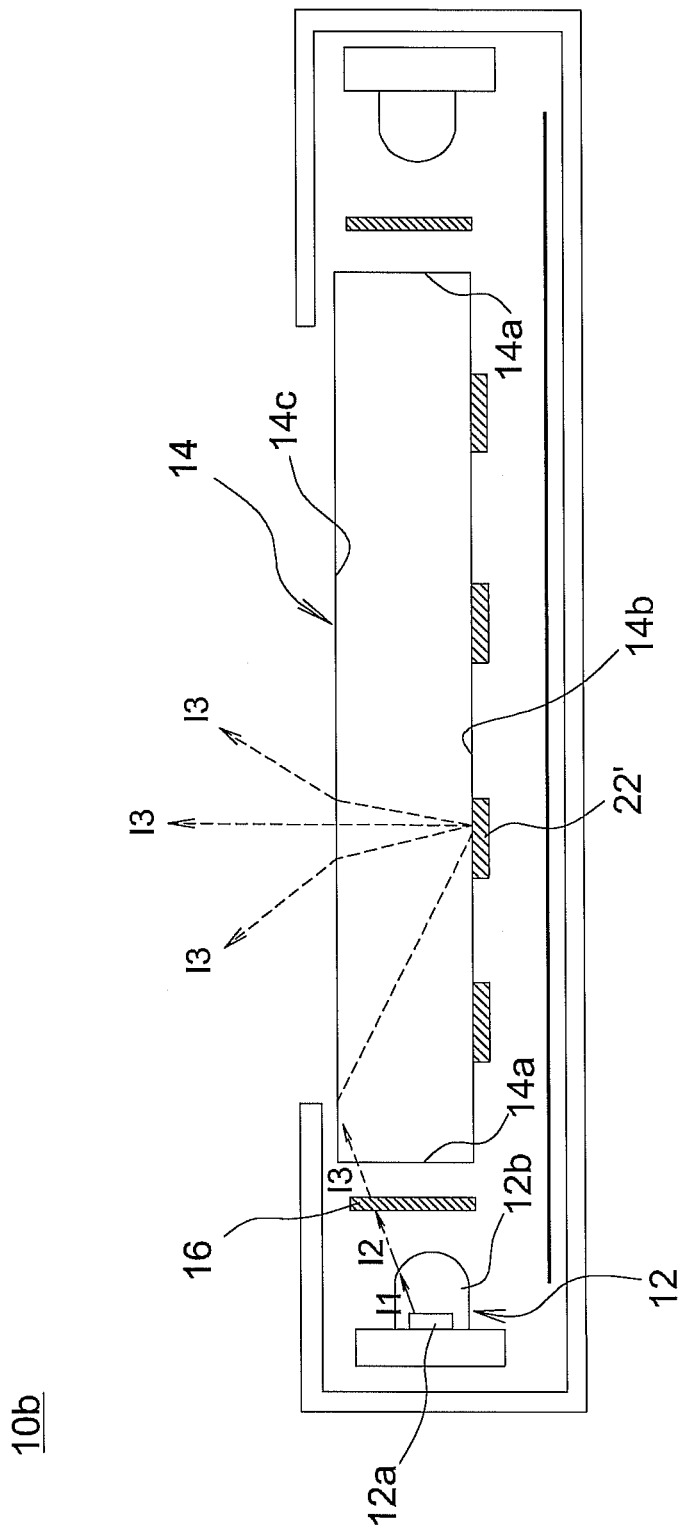
FIG. 4 shows a schematic diagram of an illumination module according to another embodiment of the invention.

As shown in FIG. 4, in an illumination module 10b according to another embodiment of the invention, the light guide plate 14 has two opposite light incident surfaces 14a, so that light may enter the light guide plate 14 via two sides. The phosphor 12b may be blended in the package of the light-emitting diode 12, and the micro dots may be fluorescent dots 22' doped with a fluorescent material. The color temperature conversion medium 16 disposed between the light-emitting diode 12 and the light incident surface 14a of the light guide plate 14 is a fluorescent layer. When the high-color-temperature white light I2 passes through the color temperature conversion medium 16, the high-color-temperature white light I2 is transformed into low-color-temperature white light I3 via the effect of fluorescence excitation. In the embodiment of FIG. 2 and this embodiment, the fluorescent layer is disposed on the light incident side. Since the light incident surface 14a is smaller compared with other surfaces of the light guide plate 14, the area of the fluorescent layer is allowed to be decreased to reduce fabrication costs. Besides, according to this embodiment, the distribution density and location of the fluorescent dots 22' can be adjusted to globally or locally adjust the degree of color temperature conversion to increase the controllability over color temperature conversion.

Figure 5:
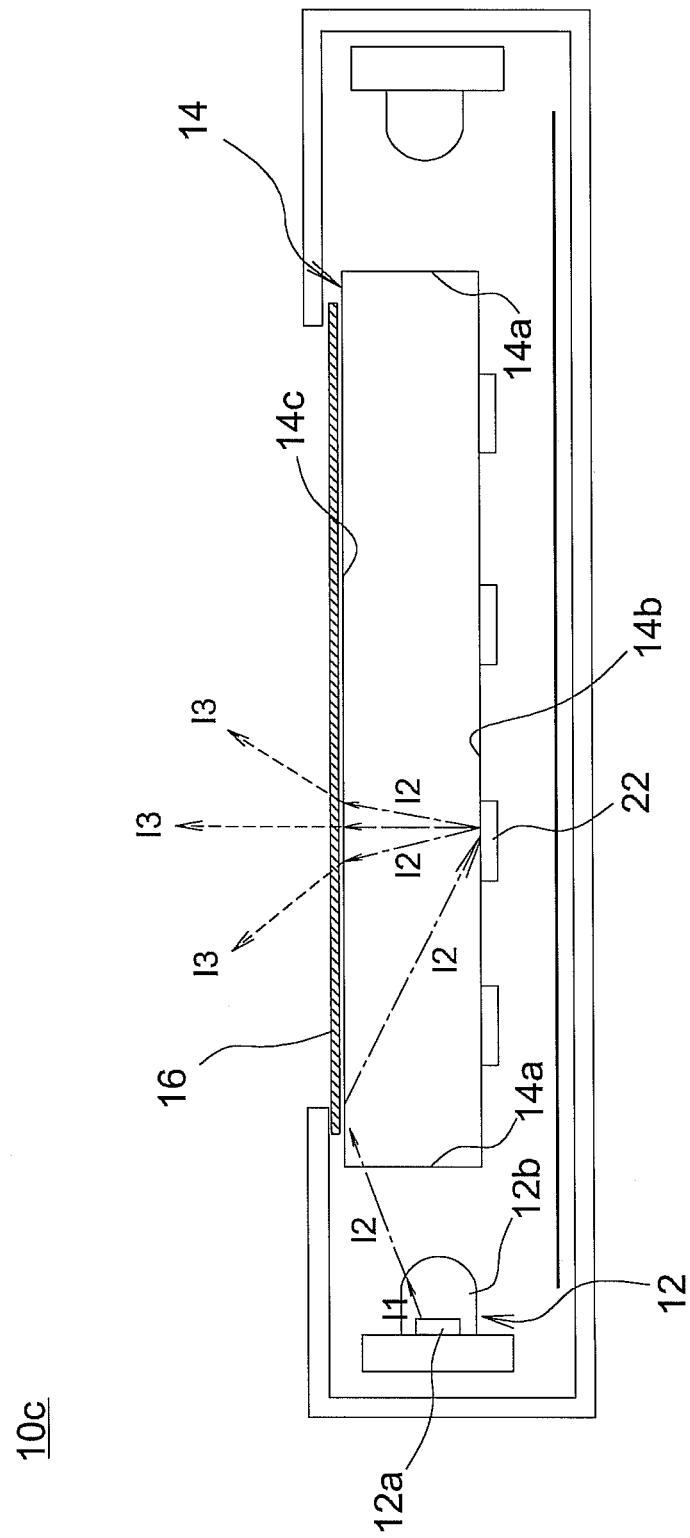
FIG. 5 shows a schematic diagram of an illumination module according to another embodiment of the invention.

As shown in FIG. 5, in an illumination module 10c according to another embodiment of the invention, the color temperature conversion medium 16 is a fluorescent layer disposed on the light-emitting side (adjacent to the light-emitting surface 14c) of the light guide plate 14. In this embodiment, the concentration or thickness distribution of the fluorescent layer in different zones can be respectively adjusted to achieve desired changes of color temperature. Since most of the light beams leaving the light guide plate 14 may pass through the fluorescent layer disposed on the light-emitting side, the illumination module 10c has good color temperature conversion efficiency.

Figure 6:
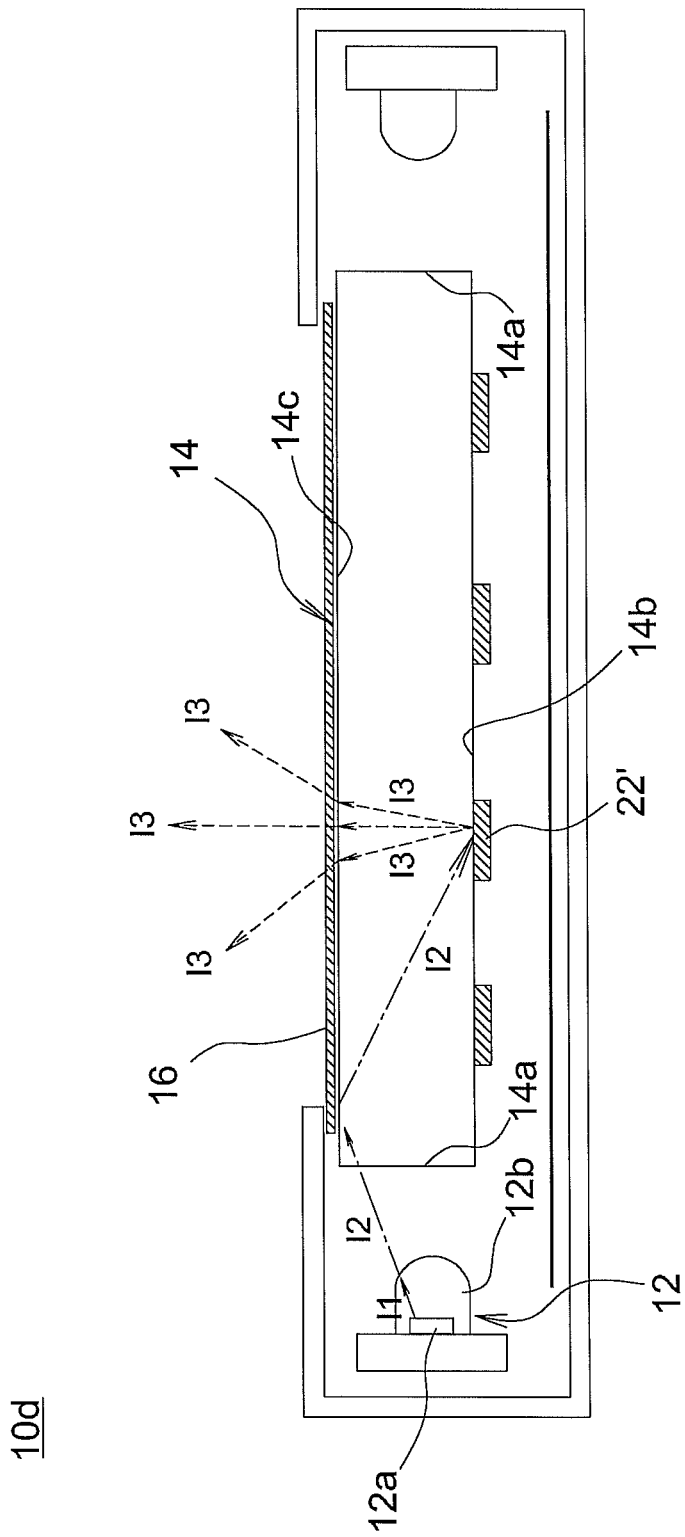
FIG. 6 shows a schematic diagram of an illumination module according to another embodiment of the invention.

As shown in FIG. 6, in an illumination module 10d according to another embodiment of the invention, the color temperature conversion medium 16 includes a fluorescent layer and fluorescent dots 22', and the fluorescent layer is disposed on the light-emitting side (adjacent to the light-emitting surface 14c) of the light guide plate 14. In this embodiment, the concentration or thickness distribution of the fluorescent layer in different zones can be respectively adjusted to achieve desired changes of color temperature. Since most of the light beams leaving the light guide plate 14 may pass through the fluorescent layer disposed on the light-emitting side, the illumination module 10d has good color temperature conversion efficiency. Besides, the arrangement of fluorescent dots 22' further increases the controllability over color temperature conversion.

Figure 7:
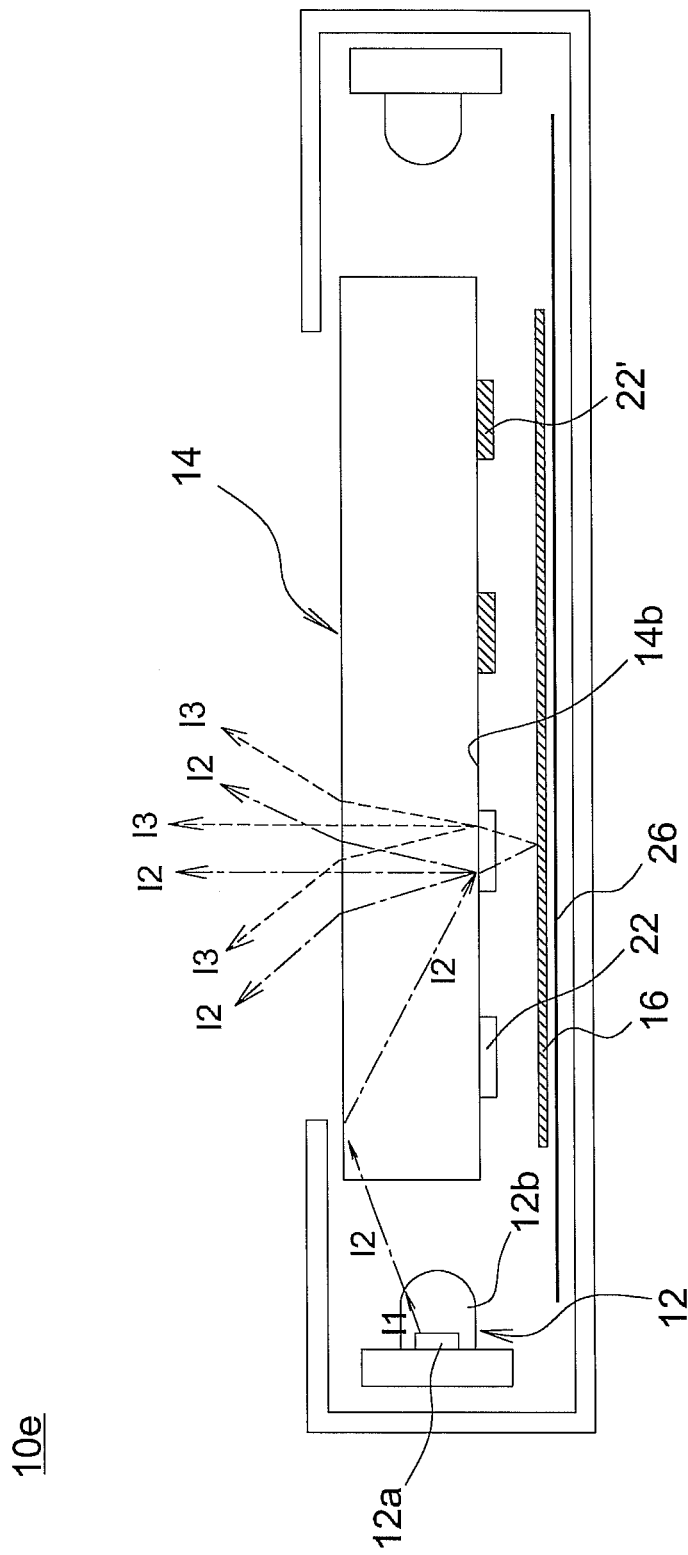
FIG. 7 shows a schematic diagram of an illumination module according to another embodiment of the invention.

As shown in FIG. 7, in an illumination module 10e according to another embodiment of the invention, the color temperature conversion medium 16 includes a fluorescent layer disposed on the bottom side (adjacent to the bottom surface 14b) of the light guide plate 14, and the fluorescent layer is disposed between the light guide plate 14 and the reflective plate 26. In this embodiment, the concentration or thickness distribution of the fluorescent layer in different zones can be respectively adjusted to achieve desired changes of color temperature. Further, since the portion of the light beam scattered towards the bottom of the light guide plate 14 is excited by the fluorescent layer, the color temperature is allowed to be finely tuned by such arrangement. Similarly, the illumination module 10e may include general micro dots 22 or fluorescent dots 22'.

Figure 8:
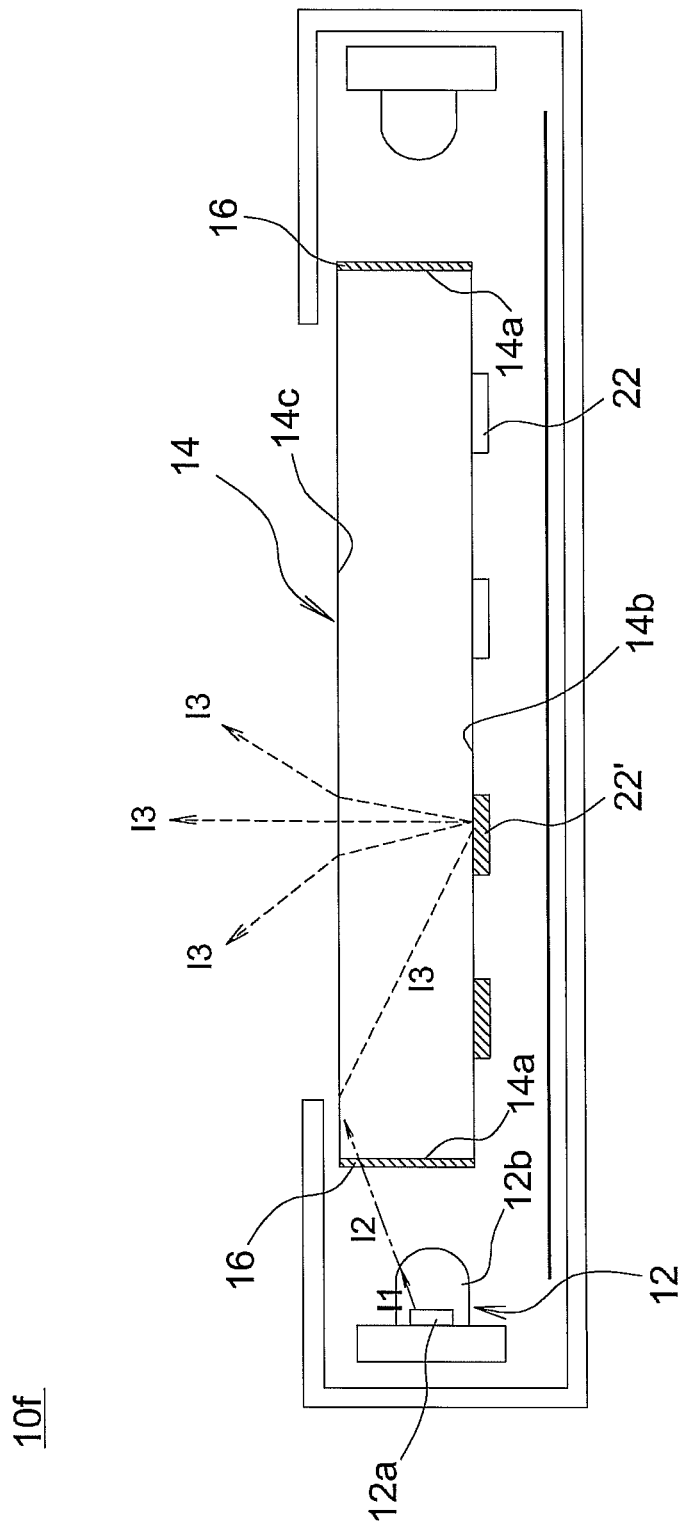
FIG. 8 shows a schematic diagram of an illumination module according to another embodiment of the invention.

As shown in FIG. 8, in an illumination module 10f according to another embodiment of the invention, the color temperature conversion medium 16 includes a fluorescent glue, and the fluorescent glue may be formed on the light incident surface 14a of the light guide plate 14 by coating, screen printing or ink-jet printing. In this embodiment, the area of the fluorescent glue is comparatively small to thereby reduce fabrication costs. Similarly, the illumination module 10f may include general micro dots 22 or fluorescent dots 22'.

Figure 9:
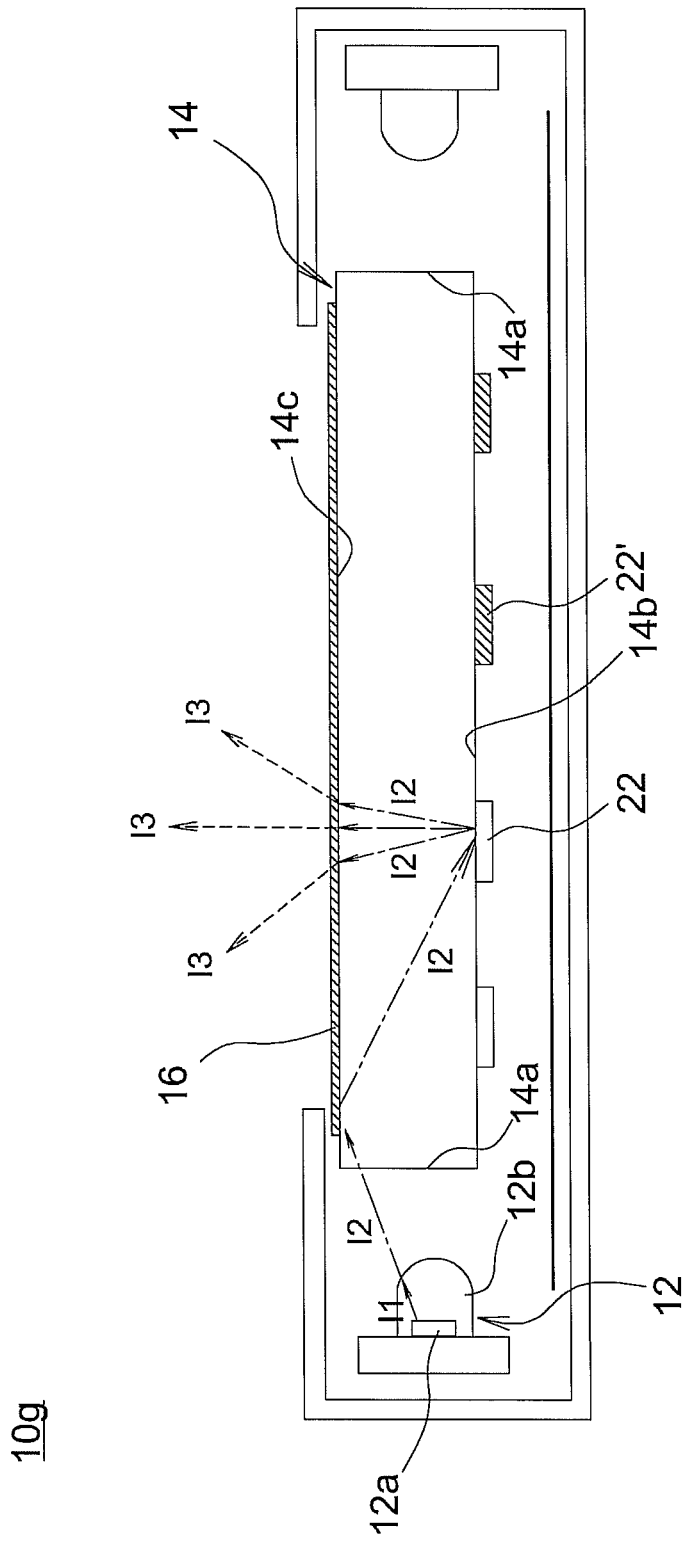
FIG. 9 shows a schematic diagram of an illumination module according to another embodiment of the invention.

As shown in FIG. 9, in an illumination module 10g according to another embodiment of the invention, the color temperature conversion medium 16 includes a fluorescent glue, and the fluorescent glue may be formed on the light-emitting surface 14c of the light guide plate 14 by coating, screen printing or ink-jet printing. In this embodiment, the concentration or thickness distribution of the fluorescent glue in different zones can be respectively adjusted to achieve desired changes of color temperature. Since most of the light beams leaving the light guide plate 14 may pass through the fluorescent glue disposed on the light-emitting side, the illumination module 10g has good color temperature conversion efficiency. Similarly, the illumination module 10g may include general micro dots 22 or fluorescent dots 22'.

Figure 10:
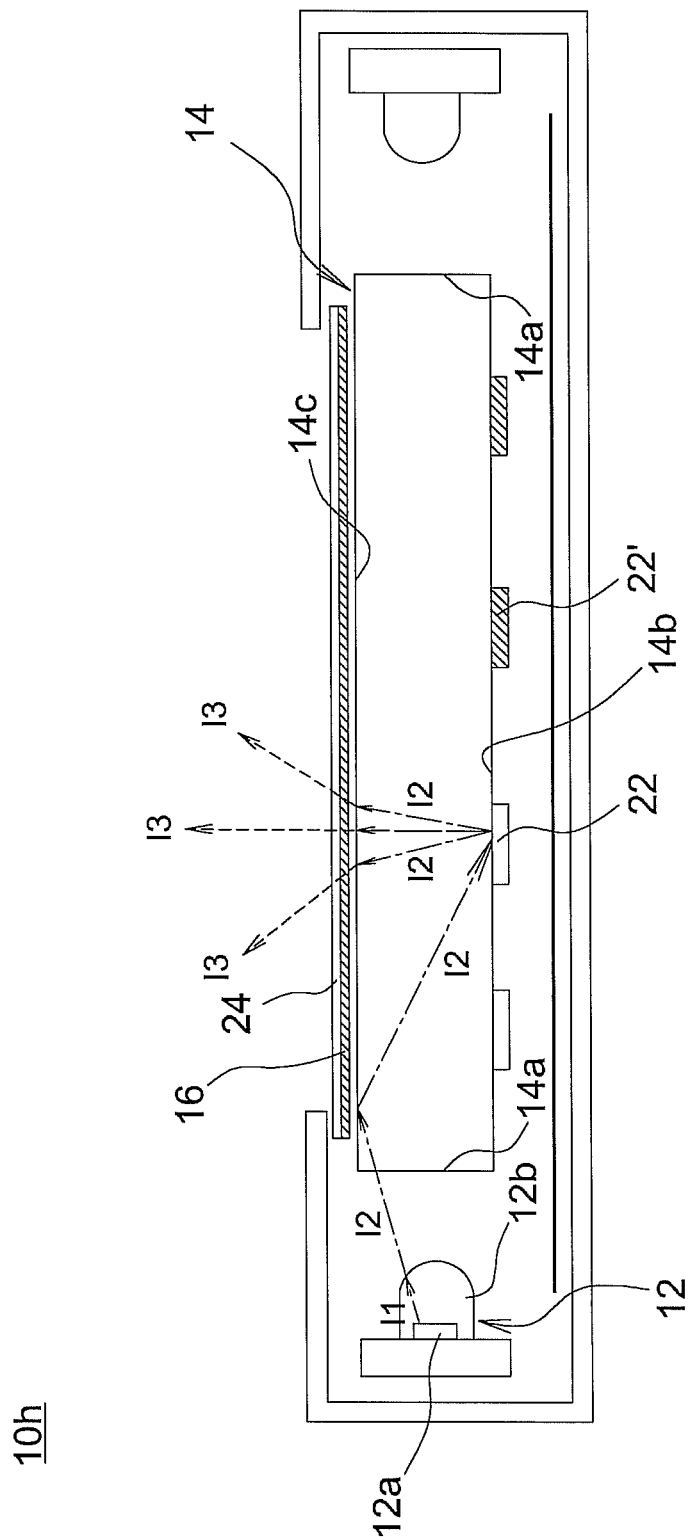
FIG. 10 shows a schematic diagram of an illumination module according to another embodiment of the invention.

As shown in FIG. 10, in an illumination module 10h according to another embodiment of the invention, an optical film 24 (such as a brightness enhancement film or diffuser film) is disposed on the light-emitting side of the light guide plate 14, and the color temperature conversion medium 16 includes a fluorescent glue. The fluorescent glue may be formed on a bottom side of the optical film 24 by coating, screen printing or ink-jet printing. In this embodiment, the concentration or thickness distribution of the fluorescent glue in different zones can be respectively adjusted to achieve desired changes of color temperature. Since most of the light beams leaving the light guide plate 14 may pass through the fluorescent glue disposed on the light-emitting side, the illumination module 10h has good color temperature conversion efficiency. Similarly, the illumination module 10h may include general micro dots 22 or fluorescent dots 22'.

Figure 11:
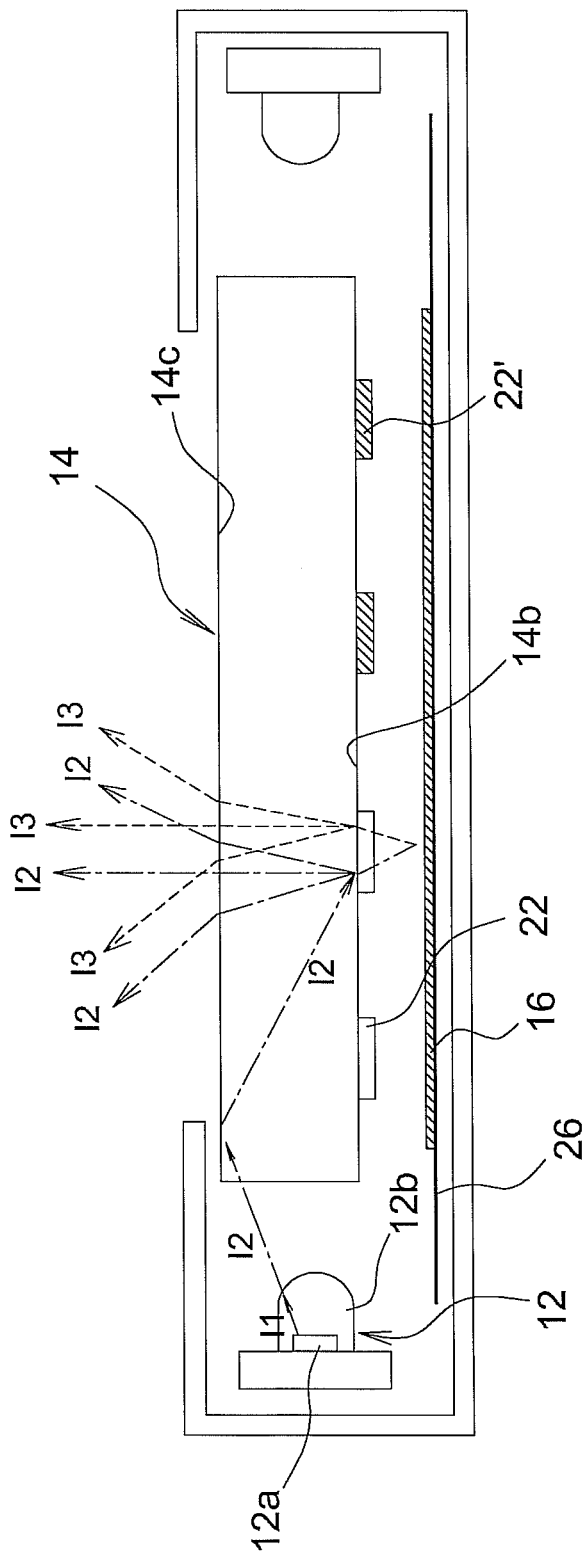
FIG. 11 shows a schematic diagram of an illumination module according to another embodiment of the invention.

As shown in FIG. 11, in an illumination module 10i according to another embodiment of the invention, the color temperature conversion medium 16 includes a fluorescent glue. The fluorescent glue may be formed on a reflective plate 26 by coating, screen printing or ink-jet printing. In this embodiment, the concentration or thickness distribution of the fluorescent glue in different zones can be respectively adjusted to achieve desired changes of color temperature. Since the portion of the light beam arriving the reflective plate 26 is excited by the fluorescent glue, the color temperature is allowed to be finely tuned by such arrangement. Similarly, the illumination module 10i may include general micro dots 22 or fluorescent dots 22'.

Certainly, in the above embodiments, the color temperature conversion medium 16 may be a dye material, and the high-color-temperature white light I2 is transformed into the low-color-temperature white light I3 through light absorption of the dye material. The dye material may be also disposed in various structures to form a dye layer, a dye glue, dye dots, etc. Besides, the micro dots 22 are not limited to be formed on the bottom surface 14b and may be formed on the light-emitting surface 14c of the light guide plate 14.

Figure 12:
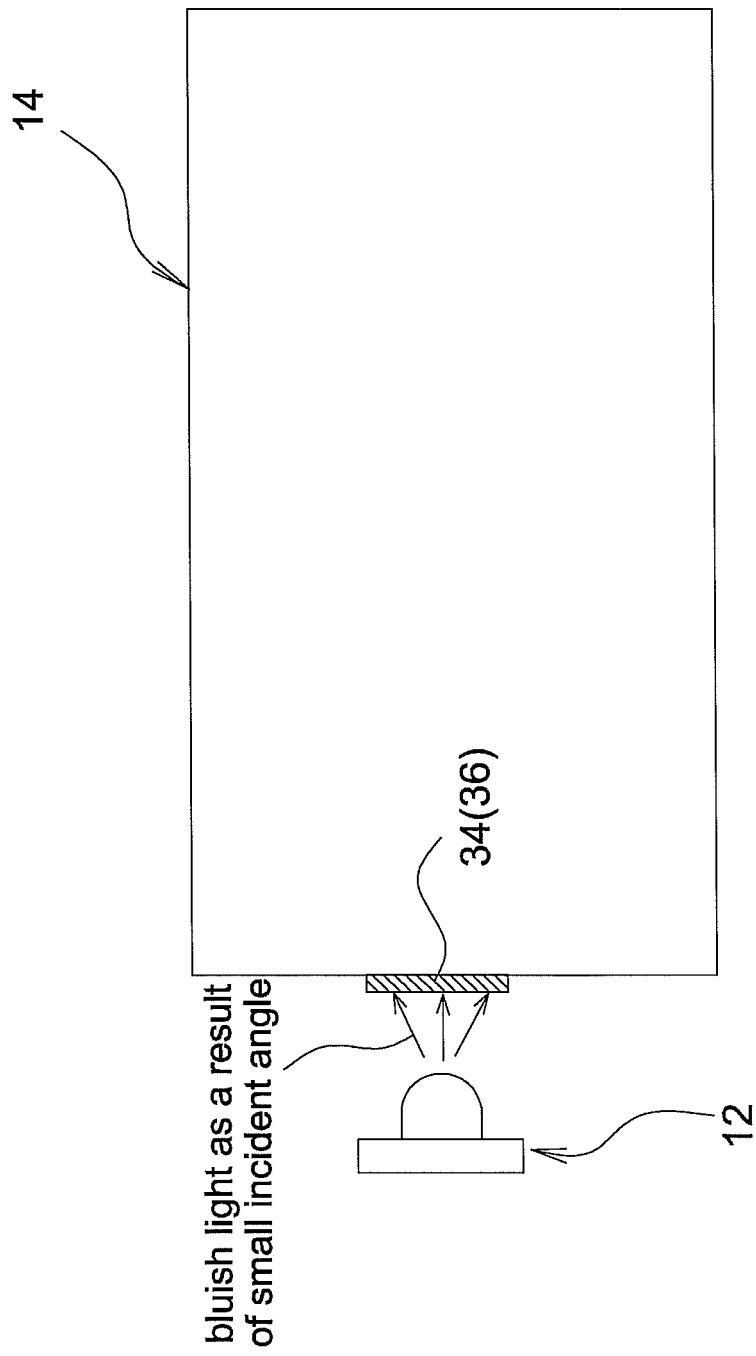
FIG. 12 shows a schematic diagram of local color compensation according to one embodiment of the invention.
Figure 13:
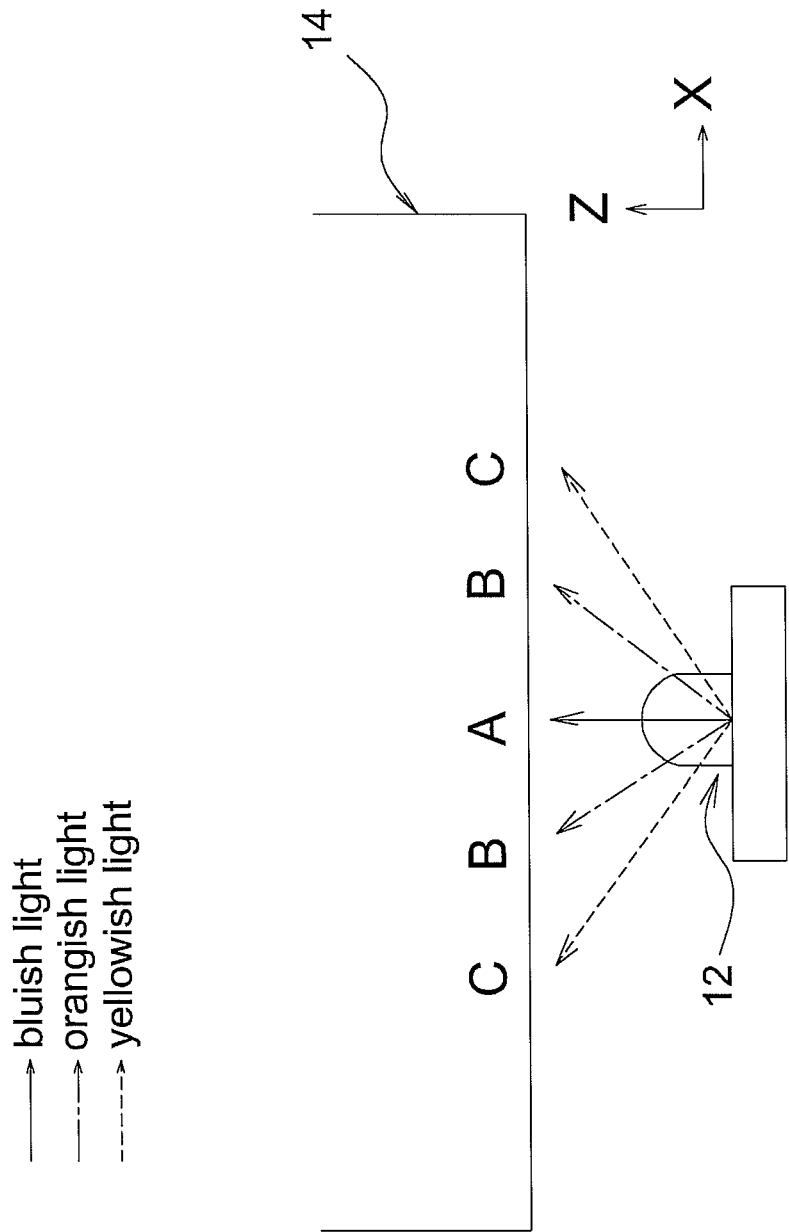
FIG. 13 shows a schematic diagram of local color compensation according to another embodiment of the invention.
Figure 14:
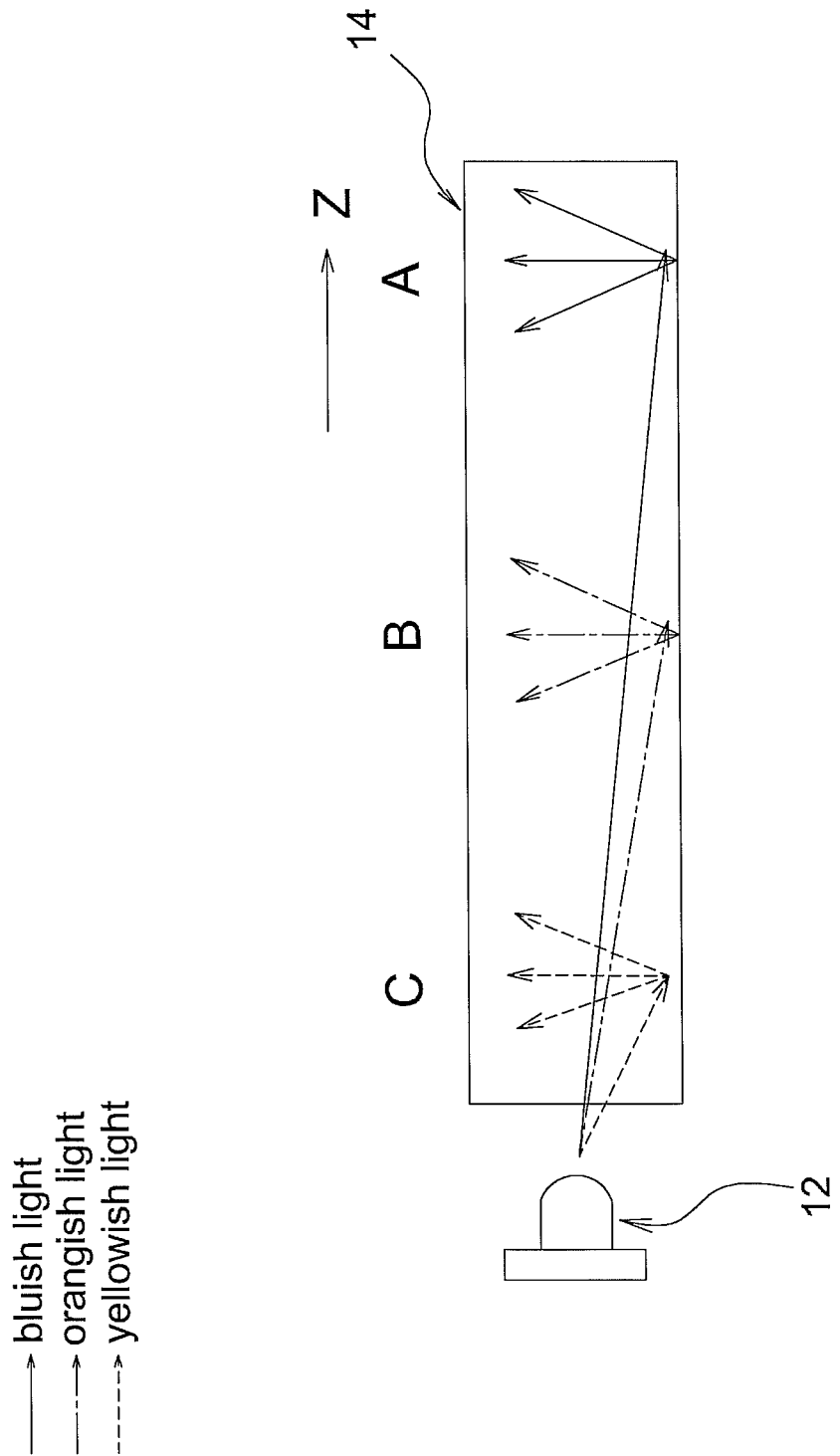
FIG. 14 shows a schematic diagram of local color compensation according to another embodiment of the invention.
Figure 15:
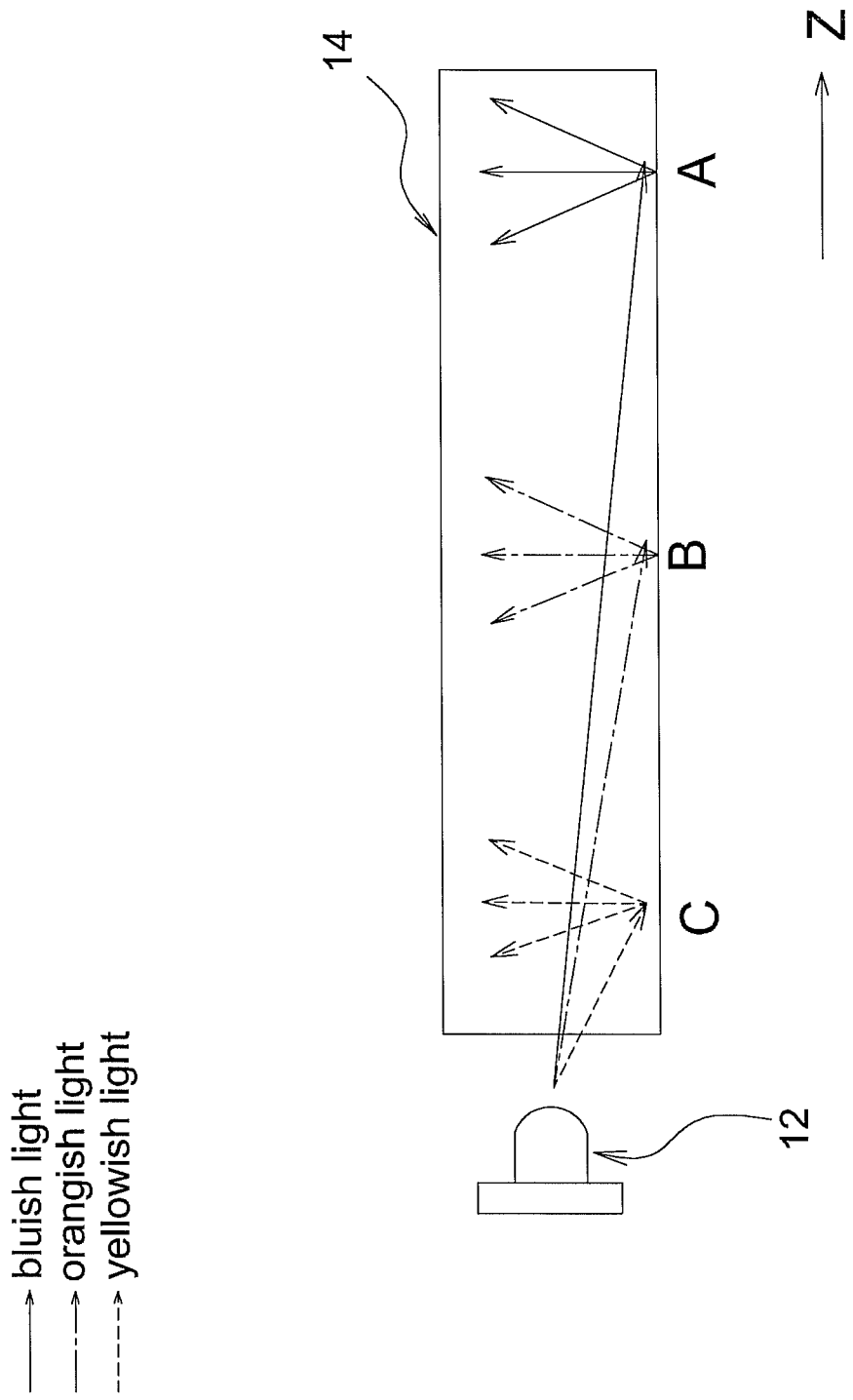
FIG. 15 shows a schematic diagram of local color compensation according to another embodiment of the invention.

Further, according to the above embodiments, local color compensation may be performed to increase color uniformity of an illumination module. For example, as shown in FIG. 12, a light beam emitted by the light-emitting diode 12 is incident on the light guide plate 14 at a smaller angle to form a projecting zone on the light guide plate 14 and result in bluish color shift. In that case, the yellow fluorescent material 34 or yellow dye material 36 may be disposed in the projecting zone in front of the light-emitting diode 12 to absorb or excite part of the blue light and to transform the blue light into yellow light so as to reduce bluish color shift. More specifically, a light beam emitted by the light-emitting diode 12 and incident on the light guide plate 14 at a small angle has a higher color temperature, and a light beam emitted by the light-emitting diode 12 and incident on the light guide plate 14 at a large angle has a lower color temperature. That is, a light beam incident on the light guide plate 14 at a smaller angle may result in bluish color shift, a light beam incident on the light guide plate 14 at a larger angle may result in yellowish color shift, and a light beam incident on the light guide plate 14 at an angle larger than the first angle and smaller than the second angle may result in orangish color shift. As shown in FIG. 13, a light incident side of the light guide plate 14 may be divided into three light projecting zones, zone A, zone B and zone C, from the center to one side of the light guide plate 14 along an X axis. When the concentration of the yellow fluorescent material or yellow dye for each projecting zone of the light guide plate 14 is set as (concentration in zone A)>(concentration in zone B)>(concentration in zone C) or the concentration of the blue dye for each projecting zone is set as (concentration in zone C)>(concentration in zone B)>(concentration in zone A), the color shift phenomenon in different zones is effectively compensated to improve the color uniformity of the illumination module. Further, in the following embodiment, the light-emitting side of the light guide plate 14 is taken into consideration. A light beam emitted by the light-emitting diode 12 and incident on the light guide plate 14 at a small angle has a higher color temperature, and a light beam emitted by the light-emitting diode 12 and incident on the light guide plate 14 at a large angle has a lower color temperature. As shown in FIG. 14, the light-emitting side of the light guide plate 14 may be divided into three light projecting zones, zone C, zone B and zone A, sequentially spaced apart from the light-emitting diode 12 along a Z axis. When the concentration of the yellow fluorescent material or yellow dye in each projecting zone of the light guide plate 14 is set as (concentration in zone A)>(concentration in zone B)>(concentration in zone C) or the concentration of the blue dye in each projecting zone is set as (concentration in zone C)>(concentration in zone B)>(concentration in zone A), the color shift phenomenon in different zones is effectively compensated. Further, in the following embodiment, the distribution of micro dots formed on a bottom of the light guide plate 14 is taken into consideration. A light beam emitted by the light-emitting diode 12 and incident on the light guide plate 14 at a small angle has a higher color temperature, and a light beam emitted by the light-emitting diode 12 and incident on the light guide plate 14 at a large angle has a lower color temperature. As shown in FIG. 15, the bottom side of the light guide plate 14 may be divided into three light projecting zones, zone C, zone B and zone A, sequentially spaced apart from the light-emitting diode 12 along a Z axis. When the concentration of the yellow fluorescent material or yellow dye coated on the micro dots in each projecting zone is set as (concentration in zone A)>(concentration in zone B)>(concentration in zone C) or the concentration of the blue dye coated on the micro dots in each projecting zone is set as (concentration in zone C)>(concentration in zone B)>(concentration in zone A), the color shift phenomenon in different zones is effectively compensated. Alternatively, the density distribution of the fluorescent micro structures or dye micro structures may be adjusted to adjust the concentration of the yellow fluorescent material or yellow dye in different projecting zones.

Further, according to the above embodiments, a fluorescent layer, a fluorescent glue, or a dye material formed on the light-emitting side of the light guide plate 14 may be modified according to the color distribution of the light-emitting surface 14c of the light guide plate 14 to compensate for the color non-uniformity. Since most of the light beams of the illumination module exit from the light-emitting side, the color shift compensation effect is comparatively obvious. On the other hand, in case a fluorescent layer, a fluorescent glue, or a dye material is formed on the bottom side of the light guide plate 14, the color shift compensation effect is comparatively small because part of the light beam is scattered towards the area under the light guide plate 14. Therefore, the emission wavelength (color), concentration, area, position, or thickness of the fluorescent/dye layer, fluorescent/dye glue, and fluorescent/dye dots are allowed to be adjusted to coarsely tune, finely tune or locally tune respective color characteristics of different regions of the illumination module so as to compensate the color shift phenomenon in the light-emitted surface of the light guide plate to improve the color uniformity of the illumination module.

Figure 16A:
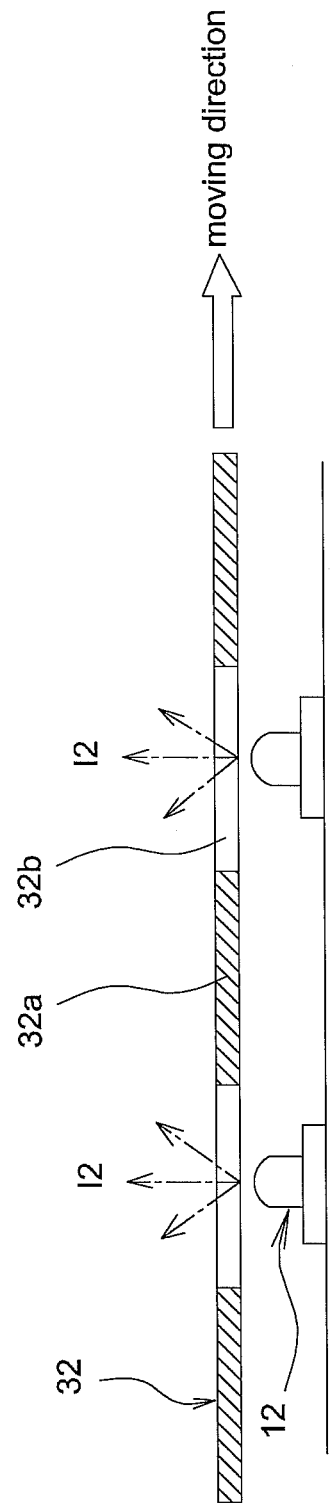
FIGS. 16A and 16B show schematic diagrams of an illumination module according to another embodiment of the invention.
Figure 16B:
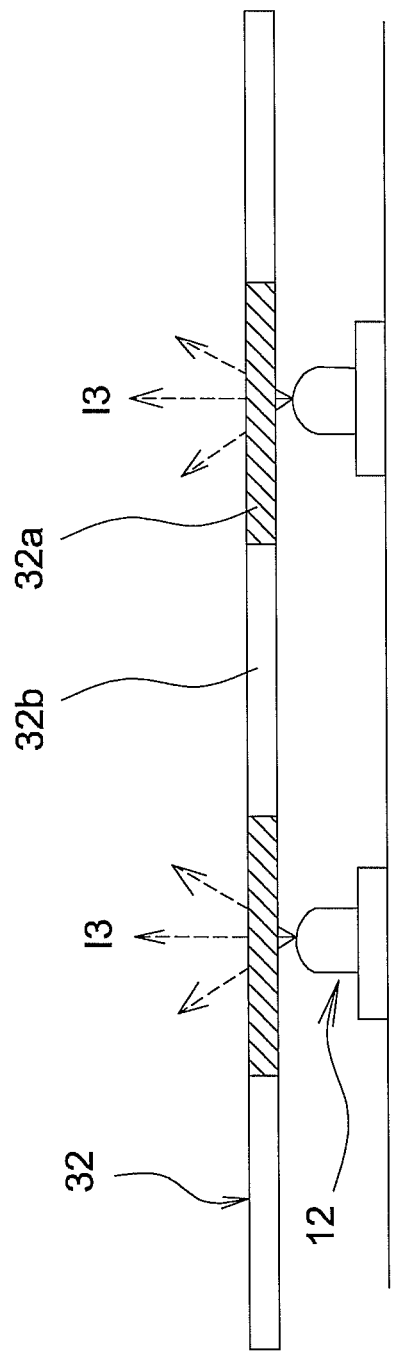

As shown in FIGS. 16A and 16B, in an illumination module 30 according to another embodiment of the invention, a moveable colored stripe 32 is disposed in a propagation path of the light-emitting diode 12. A plurality of color temperature conversion zones 32a and a plurality of transparent zones 32b are alternately formed on the colored stripe 32. The color temperature conversion zone 32a is, for example, formed by laminating a fluorescent/dye layer or coating a fluorescent/dye glue. By moving the colored stripe 32, the light beam of the light-emitting diode 12 may pass through the transparent zone 32b without changing the color temperature (FIG. 16A), or the light beam of the light-emitting diode 12 may pass through the color temperature conversion zone 32a to change the color temperature (FIG. 16B). Therefore, the purpose of switching on or off color temperature conversion effect is achieved.

Besides, the light-emitting diodes 12 used in the illumination module according to the above embodiments are not limited to be the same color or the same color temperature. If there are two or more than two colors of light-emitting diodes 12, corresponding fluorescent materials or dye materials are disposed on the propagation path of different color beams according to respective position of the light-emitting diodes 12 to achieve color temperature conversion or color compensation.

In conclusion, the illumination module of the embodiment or the embodiments of the invention may have at least one of the following advantages.

According to the above embodiments, light emitted by a light-emitting chip is excited twice by a fluorescent material or excited by fluorescent excitation and transformed by light absorption to obtain white light with a low color temperature, and the white light with a low color temperature is allowed to be directly used for illumination purposes. Therefore, by the design of the secondary conversion, low-cost light-emitting diodes (light-emitting diodes with high-color temperature white light) are allowed to serve as an illumination light source. Therefore, the fabrication costs of using light-emitting diodes as an illumination light source are decreased. Further, the emission wavelength (color), concentration, area, position, or thickness of the fluorescent/dye layer, fluorescent/dye glue, and fluorescent/dye dots are allowed to be adjusted to coarsely tune, finely tune or locally tune respective color characteristics of different regions of the light guide plate so that the color shift phenomenon in different zones is effectively reduced to improve the color uniformity of the illumination module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An illumination module, comprising:
   at least one light-emitting diode for emitting first white light with a first color temperature, wherein the light-emitting diode comprises at least one light-emitting chip and a phosphor, the light-emitting chip is capable of emitting a light beam having a specific wavelength, and the phosphor is capable of transforming the light beam into the first white light with the first color temperature;
   a light guide plate disposed adjacent to the light-emitting diode; and
   a color temperature conversion medium disposed in a propagation path of the first white light to transform the first white light into second white light with a second color temperature, wherein the second color temperature is smaller than the first color temperature.

2. The illumination module as claimed in claim 1, wherein the light guide plate has at least one light incident surface, a bottom surface, and a light-emitting surface opposite the bottom surface, wherein the bottom surface and the light-emitting surface are connected with the light incident surface and the light-emitting diode is adjacent to the light incident surface.

3. The illumination module as claimed in claim 2, wherein the color temperature conversion medium comprises at least one fluorescent layer, and the fluorescent layer is disposed in at least one of positions between the light-emitting diode and the light incident surface, adjacent to the light-emitting surface, and adjacent to the bottom surface.

4. The illumination module as claimed in claim 2, wherein the color temperature conversion medium comprises at least one dye layer, and the dye layer is disposed in at least one of positions between the light-emitting diode and the light incident surface, adjacent to the light-emitting surface, and adjacent to the bottom surface.

5. The illumination module as claimed in claim 2, further comprising:
   a reflective plate disposed adjacent to the bottom surface;
   at least one optical film disposed adjacent to the light-emitting surface; and
   a plurality of micro dots formed on at least one of the bottom surface and the light-emitting surface.

6. The illumination module as claimed in claim 5, wherein the micro dots comprise fluorescent dots or dye dots.

7. The illumination module as claimed in claim 5, wherein the color temperature conversion medium comprises a fluorescent layer or a dye layer disposed between the light guide plate and the reflective plate.

8. The illumination module as claimed in claim 5, wherein the color temperature conversion medium comprises a fluorescent glue, and the fluorescent glue is formed on at least one position of the light incident surface of the light guide plate, the light-emitting surface of the light guide plate, and the reflective plate and the optical film.

9. The illumination module as claimed in claim 5, wherein the color temperature conversion medium comprises a dye glue and the dye glue is formed on at least one position of the light incident surface of the light guide plate, the light-emitting surface of the light guide plate, and the reflective plate and the optical film.

10. The illumination module as claimed in claim 1, wherein the first color temperature is larger than 9000K and the second color temperature is in the range of 3000K to 6500K.

11. The illumination module as claimed in claim 1, further comprising:
    a colored stripe disposed in a propagation path of the first white light, wherein a plurality of transparent zones and a plurality of color temperature conversion zones are alternately formed on the colored stripe, and the color temperature of the first white light is selectively changed by moving the colored stripe.

12. An illumination module, comprising:
    at least one light-emitting diode for emitting first white light with a first color temperature, wherein the light-emitting diode comprises at least one light-emitting chip and a phosphor, the light-emitting chip is capable of emitting a light beam having a specific wavelength, and the phosphor is capable of transforming the light beam into the first white light with the first color temperature;
    a light guide plate disposed adjacent to the light-emitting diode, wherein the light guide plate has at least one light incident surface, a bottom surface, and a light-emitting surface opposite the bottom surface, wherein the bottom surface and the light-emitting surface are connected with the light incident surface and the light-emitting diode is adjacent to the light incident surface;
    a reflective plate disposed adjacent to the bottom surface;
    at least one optical film disposed adjacent to the light-emitting surface;
    a plurality of micro dots formed on at least one of the bottom surface and the light-emitting surface; and
    a color temperature conversion medium disposed in a propagation path of the first white light to transform the first white light into second white light with a second color temperature, wherein the second color temperature is smaller than the first color temperature, and the color, concentration distribution, position distribution, area distribution, or thickness distribution of the color temperature conversion medium varies according to respective color display characteristics of different regions of the light-emitting surface of the light guide plate.

13. The illumination module as claimed in claim 12, wherein a capability to lower color temperature of the color temperature conversion medium varies along with the position of the color temperature conversion medium.

14. The illumination module as claimed in claim 12, wherein a light beam of the first white light incident on the light incident surface at a larger angle results in yellowish color shift and forms a first projecting zone on the light guide plate, and a light beam of the first white light incident on the light incident surface at a smaller angle results in bluish color shift and forms a second projecting zone on the light guide plate.

15. The illumination module as claimed in claim 14, wherein the color temperature conversion medium is a yellow phosphor or a yellow dye, and the concentration, area or thickness of the color temperature conversion medium distributed in the second projecting zone is larger than the concentration, area or thickness of the color temperature conversion medium distributed in the first projecting zone.

16. The illumination module as claimed in claim 14, wherein the color temperature conversion medium comprises a plurality of yellow fluorescent dots or yellow dye dots, and the distribution density of the yellow fluorescent dots or the yellow dye dots in the second projecting zone is larger than the distribution density of the yellow fluorescent dots or the yellow dye dots in the first projecting zone.

* * * * *